US012589860B2

(12) United States Patent　　　(10) Patent No.: US 12,589,860 B2

Lacabe　　　(45) Date of Patent: Mar. 31, 2026

(54) INTUITIVE-FLIGHT CONTROL SYSTEM

(71) Applicant: Keith Lacabe, San Francisco, CA (US)

(72) Inventor: Keith Lacabe, San Francisco, CA (US)

(73) Assignee: Keith Lacabe, San Francisco, CA (US)

( * ) Notice: Subject to any disclaimer, the term of this patent is extended or adjusted under 35 U.S.C. 154(b) by 29 days.

(21) Appl. No.: 18/591,570

(22) Filed: Feb. 29, 2024

(65) Prior Publication Data

US 2025/0276787 A1　　Sep. 4, 2025

(51) Int. Cl.
　　　*B64C 13/12*　　(2006.01)
　　　*B64C 13/04*　　(2006.01)
(52) U.S. Cl.
　　　CPC .......... *B64C 13/12* (2013.01); *B64C 13/0423*
　　　　　(2018.01); *B64C 13/044* (2018.01)
(58) Field of Classification Search
　　　CPC ...... B64C 13/0423; B64C 13/12; B64C 19/00
　　　See application file for complete search history.

(56) References Cited

U.S. PATENT DOCUMENTS

| | | | | |
|---|---|---|---|---|
| 8,056,866 | B2 * | 11/2011 | De Roche | B64C 39/026 |
| | | | | 244/6 |
| 8,099,200 | B2 * | 1/2012 | Coombs | B62K 23/00 |
| | | | | 701/4 |

| | | | | |
|---|---|---|---|---|
| 8,651,432 | B2 * | 2/2014 | De Roche | B64C 29/0025 |
| | | | | 244/221 |
| 2005/0230524 | A1 * | 10/2005 | Ishiba | B60F 5/02 |
| | | | | 244/23 A |
| 2009/0076686 | A1 * | 3/2009 | Schox | B62D 1/02 |
| | | | | 701/45 |
| 2016/0375982 | A1 * | 12/2016 | Rifenburgh | B64C 27/20 |
| | | | | 244/17.19 |
| 2019/0106211 | A1 * | 4/2019 | Longhi | B64C 27/08 |
| 2019/0302803 | A1 * | 10/2019 | Misfeldt | B64C 13/0423 |
| 2021/0253261 | A1 * | 8/2021 | Furukawa | B64C 13/0423 |

* cited by examiner

*Primary Examiner* — Richard G Davis

(74) *Attorney, Agent, or Firm* — Global Gateway Law, Inc.

(57)　　　ABSTRACT

An aircraft comprising: a chassis, a flight computer, a left footrest having a left pressure pad and a right footrest having a right pressure pad, the left footrest and right footrest being supported by the chassis, and a set of handlebars mounted to the chassis via a stem and steer tube that is orthogonal to the handlebars, wherein the handlebars are rotatable about its longitudinal axis and about a longitudinal axis of the steer tube is disclosed. In disclosed embodiments, the aircraft is steerable in a roll axis by an application of pressure on the left footrest and right footrest, in the yaw axis by rotating the handlebars about the longitudinal axis of the steer tube and in the pitch axis by rotating the handlebars in its longitudinal axis.

10 Claims, 11 Drawing Sheets

219    221    222

223

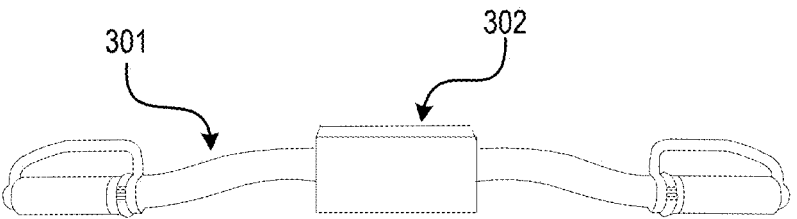
FIGURE 3A
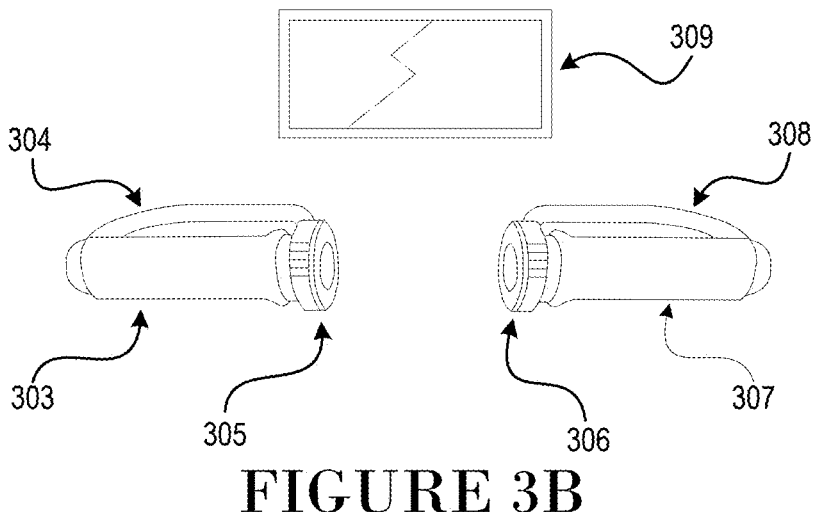
FIGURE 3B
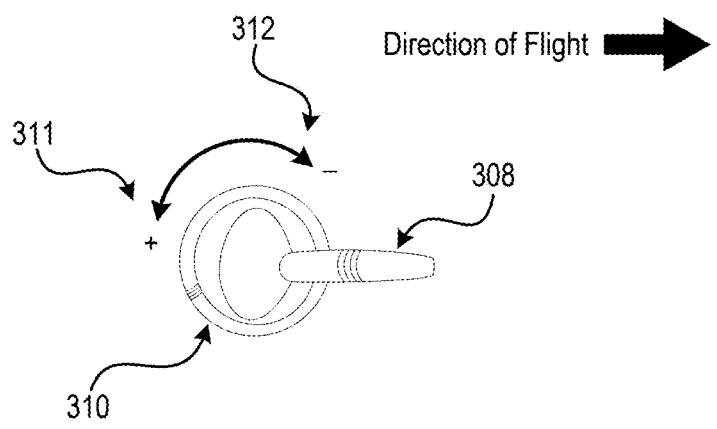
Direction of Flight ➡
FIGURE 3C – SIDE VIEW

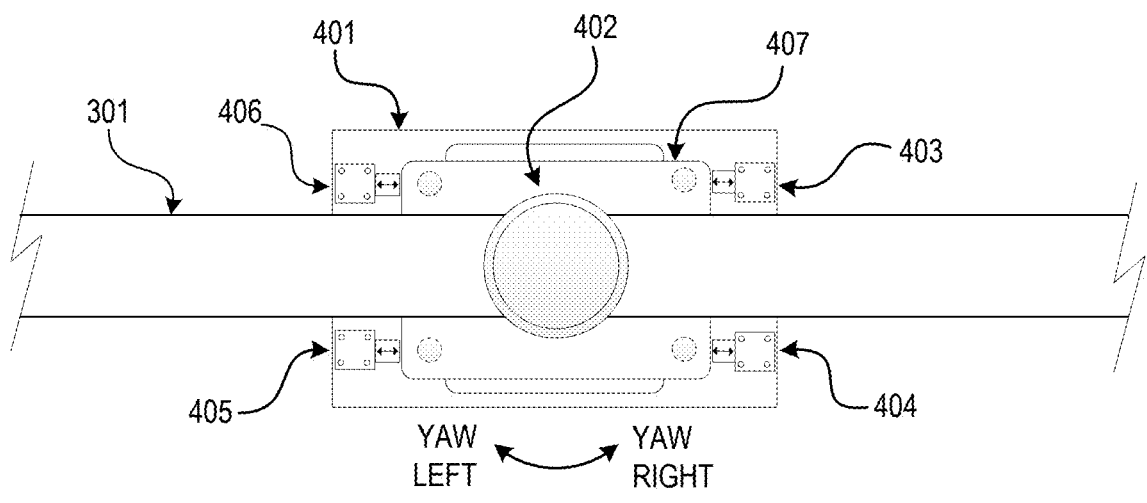
FIGURE 4A – TOP VIEW
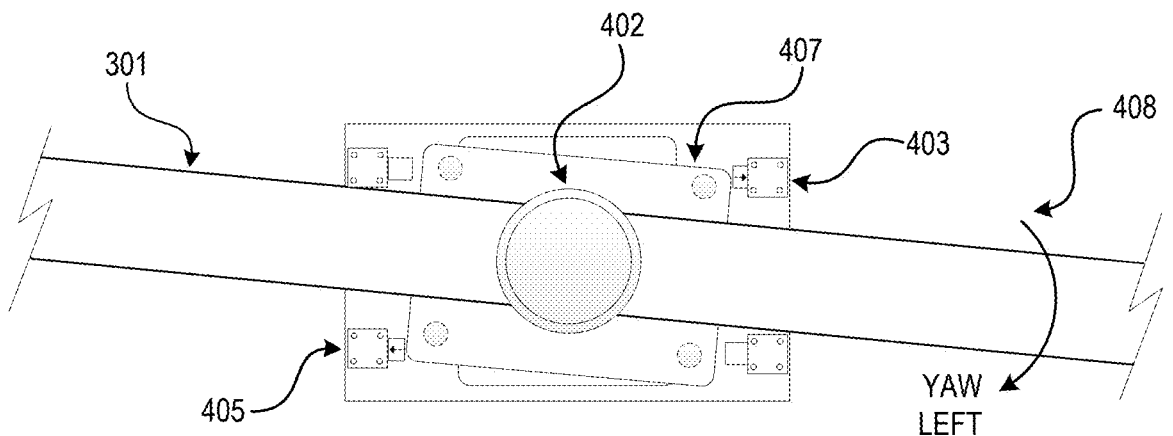
FIGURE 4B – TOP VIEW
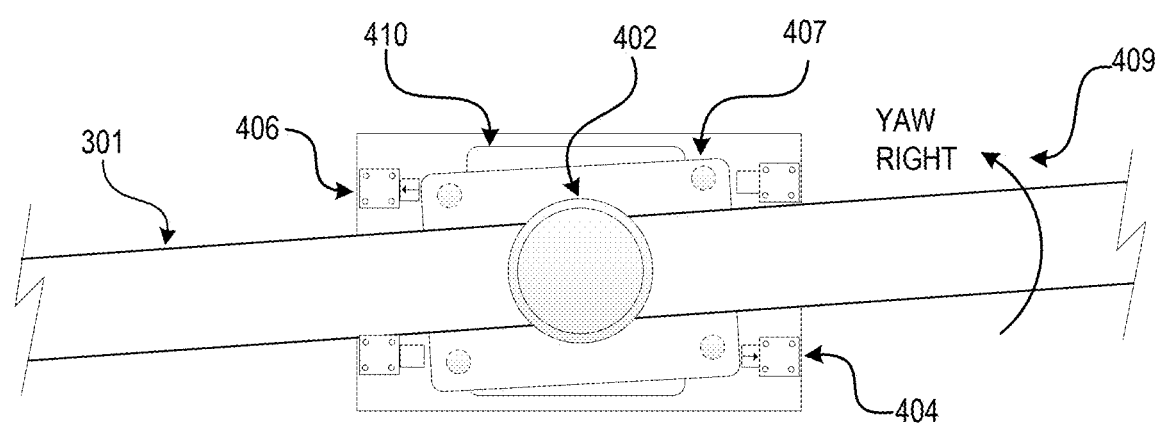
FIGURE 4C – TOP VIEW

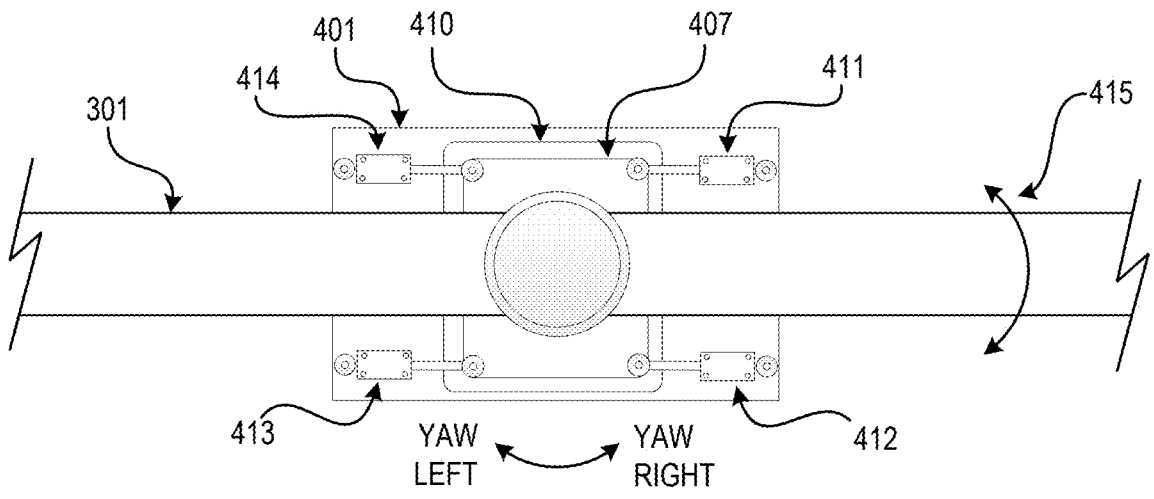
FIGURE 4D – TOP VIEW
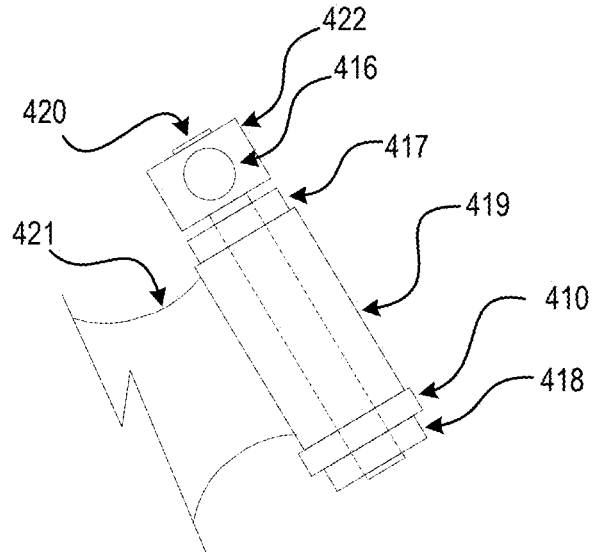
FIGURE 4E – SIDE VIEW

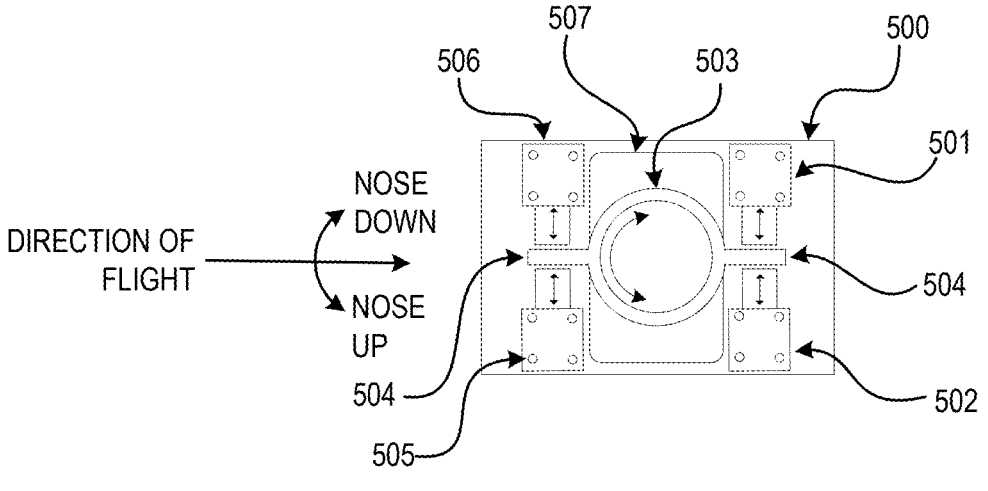
DIRECTION OF
FLIGHT
NOSE
DOWN
NOSE
UP
FIGURE 5A - SIDE VIEW

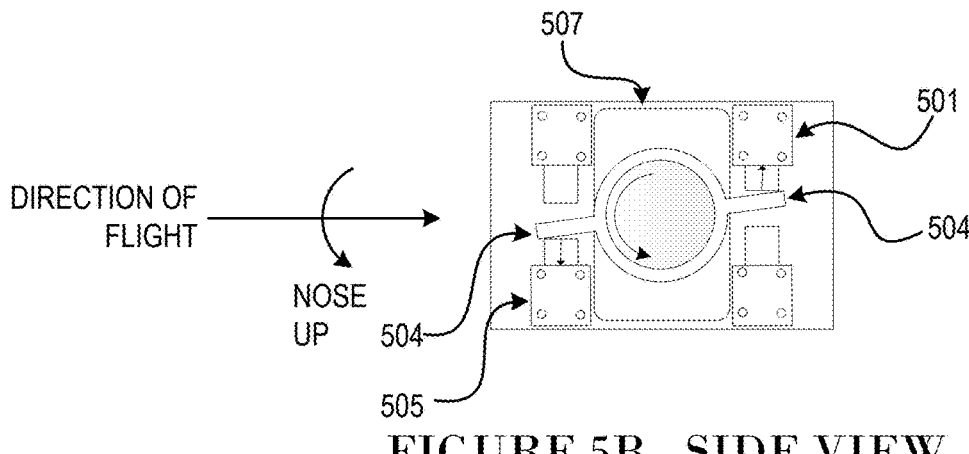
FIGURE 5B - SIDE VIEW
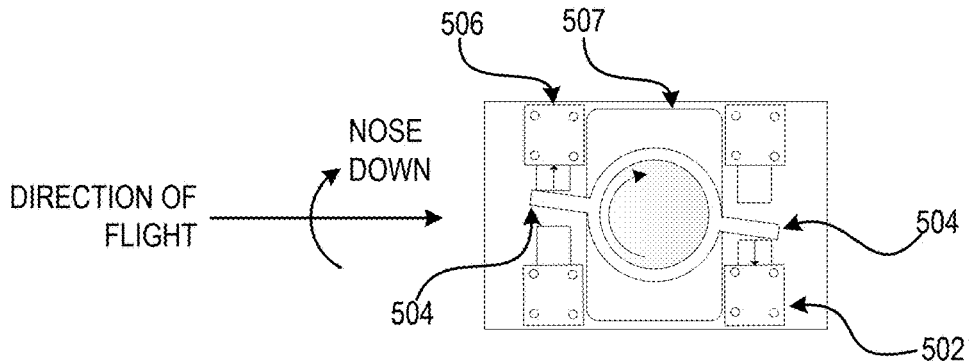
FIGURE 5C - SIDE VIEW
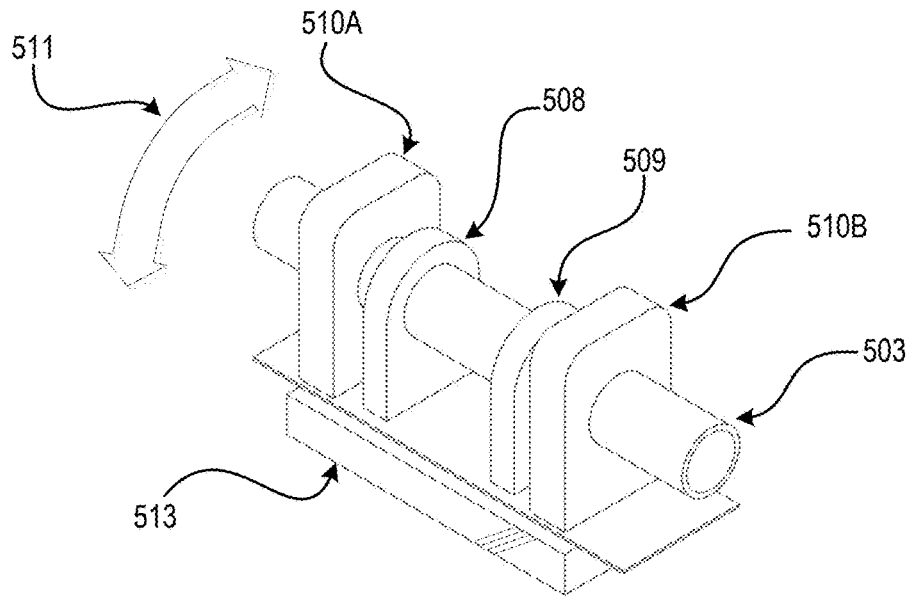
FIGURE 5D

INTUITIVE-FLIGHT CONTROL SYSTEM

FIELD OF THE INVENTION

The invention relates generally to the flight control system of an aerial vehicle and more specifically to the manual flight control of an aerial vehicle in-flight while not under autonomous, programmed or centralized flight control.

BACKGROUND

Aircraft flight control systems have been in place since the first airplanes took to the skies. Since then, a number of advancements have been made to increase the efficiency and reliability of these systems. Many aircraft still use mechanical flight control systems which utilize a combination of cables, rods, and pulleys to manipulate the flight control surfaces from the flight deck. A yoke or steering wheel is employed to manipulate ailerons for pitch and roll, while foot pedals serve to manipulate a rudder for yaw. These types of mechanical flight control systems can be found on general and sport category aircraft where the flight forces on the control surfaces are not too great.

As aircraft increased in size and weight it became necessary to create greater pressure on the control surfaces; enter hydromechanical. Hydromechanical control uses a mechanical circuit and a hydraulic circuit which reduces complexity and weight while greatly increasing the amount of force that can be applied to the control surface. These systems incorporate redundant components for reliability and are designed to give the pilot tactical feedback of the forces on the control surfaces in order to inform the pilot of the stresses the aircraft is enduring.

As aircraft became more sophisticated, a flight control system was developed where the control surfaces are actuated by electric motors and digital computers. Sometimes employing fiber optic cables, these systems are called "fly-by-wire" flight control. This type of flight control system replaces the physical connection between the pilot controls, or inceptors, and the control surfaces with an electrical interface. Similar to a hydromechanical system, no physical connection is made between the control surfaces and the pilot's controls, which are instead replaced by the electrical interface. As before, a yoke or steering wheel and foot pedals are used as inceptors for controlled flight, but as their movements are recorded, the digital flight computer and its associated software translates those movements into the physical movements of the flight surfaces.

These modern fly-by-wire systems can be found on larger aircraft where the forces required to actuate the control surfaces are greater than the older mechanical flight systems can handle. While many fly-by-wire systems can be found on fixed wing aircraft, they can also be found on helicopters, tilt-rotor airplanes, and vertical take-off and landing (VTOL) aircraft. These systems function equally as well whether the aircraft is under manual, pilot control or under automated, programmed or autopilot control.

Starting in 1999 NASA began developing a flight control program called Intelligent Flight Control System (IFCS). The goal of the system was to restore the handling qualities of a damaged aircraft using AI technology. Connected directly to the control surfaces, the IFCS improves aircraft performance under normal operations, as well as assisting the pilot to maintain control after the aircraft has been damaged or suffered a system failure.

While these advanced systems are employed in commercial, military, and even civilian aircraft, some aircraft still employ the older mechanical systems as well as a variety of other systems.

For example, some aircraft in the sport pilot category, like hang gliders, rely on weight-shift control to maneuver the aircraft. Weight-shift controlled flight is achieved as the pilot uses their body weight "shift" to dip one of the two leading edges of the wing (aerofoil) to control the aircraft's direction and altitude. Similar to hang gliders are ultralights; while a hang glider relies on air currents to maintain or increase altitude, an ultralight uses an engine and propeller to create lift. Once airborne though, both aircraft use their weight-shift to manipulate the leading edge of the wing in order to change their heading and altitude.

And finally, helicopters continue to utilize a cyclic to tilt the rotor in the desired direction along with a collective to manipulate rotor pitch and anti-torque pedals to control yaw. While these systems are robust, they have always been seen as rather complicated and difficult to maintain.

All of these flight control systems are used to manipulate the three axis of rotation that constitute controlled flight: pitch, yaw and roll. In general, controlled flight is maintained by input from the flightdeck inceptors to the aircraft's control surfaces like ailerons, elevators, and rudder. These control surfaces are used to change the air pressure and air flow in order to make changes to the direction, attitude, and altitude of the aircraft.

Seemingly unrelated to aircraft, are two of the most common forms of transportation around the world: the motorcycle and the scooter. The similarities between motorcycles and scooters lie in their basic components, control systems, and weight distributed steering. Motorcycles and scooters have two wheels, a seat, a set of handlebars with grips and use a throttle to control the forward speed of the vehicle and brakes to slow it down. Both also use the rider's weight to assist in turning the vehicle when moving.

The throttle controls the speed of the vehicle by twisting the grip on the right-hand side of the handlebars. When the throttle is twisted in a counter-clockwise direction, the forward speed of the vehicle increases, while turning the throttle clockwise decreases the forward speed of the vehicle. The throttle behavior is similar to pushing down or releasing the accelerator pedal in an automobile. Also included on motorcycles and scooters are brakes. A brake pedal, traditionally on the right side of the vehicle, is used to control the rear brakes, while a hand lever, usually on the right side of the handlebars, is employed to activate the front brake. Brakes are used in tandem or individually to slow the vehicle.

The basic aspects of riding a motorcycle or scooter are similar to flying an aircraft in two specific ways. First, the handlebars can be turned left and right in order to steer the motorcycle, similar to turning the steering wheel on an airplane, which incites a turn by activating the tail rudder, or "yaw." Second, the motorcycle rider uses their weight on the foot pedals to control what would be considered the "roll" of the vehicle, just as a pilot uses their feet to control the airplane's roll. This is similar to how a hang glider or ultra-light pilot uses their body weight to dip the front of the wing to incite a turn. When riding a motorcycle or scooter, this body weight shift (lean) is used to maintain control in a turn while moving. Motorcycle riders (and even bicycle riders) have been leaning into corners since the advent of two wheeled vehicles. This is because leaning into a turn is an intuitive action that even beginner riders employ almost instinctively. Similarly, professional motorcycle riders are trained to put as much weight as possible on the foot peg of the direction they are turning. The weight pushing down on the foot peg, which resides as low as possible on the motorcycle, helps lower the center of gravity and thus give the rider more control and speed through a corner.

Embodiments of the present disclosure envisions an improved online commerce platform that solves these problems.

BRIEF DESCRIPTION OF THE DRAWINGS

FIG. 3A illustrates the basic components of a handlebar system for I-FCS, according to some embodiments.

FIG. 3B illustrates in detail an example of the handlebar hand grips for the I-FCS, including an I-FCS graphical user interface (GUI) screen, according to some embodiments.

FIG. 3C illustrates a "throttle" hand grip and the twisting motion used to increase or decrease the forward or rearward movement of the aircraft, according to some embodiments.

FIG. 4A illustrates an example of a yaw control using a linear potentiometer sensor array for the I-FCS, according to some embodiments.

FIG. 4B shows pilot controlled handlebars turned right, inciting sensors to indicate a yaw left command, according to some embodiments.

FIG. 4C shows pilot controlled handlebars turned left, inciting sensors to indicate a yaw right command, according to some embodiments.

FIG. 4D illustrates an example of a linear positioning sensor array for yaw control for the I-FCS, according to some embodiments.

FIG. 4E illustrates an example of a steering angle sensor array for yaw control for the I-FCS, according to some embodiments.

FIG. 5A illustrates an example of a linear positioning control sensor array for pitch control for the I-FCS, according to some embodiments.

FIG. 5B shows pilot controlled handlebars in a rotational rearward position, inciting pitch control sensors indicating a nose up command, according to some embodiments.

FIG. 5C shows pilot controlled handlebars in a rotational forward position, inciting pitch control sensors indicating a nose a nose down command, according to some embodiments.

FIG. 5D illustrates an example of a rotary positioning sensor array for pitch control for the I-FSC, according to some embodiments.

SUMMARY

In one embodiment, an aircraft includes a chassis, a flight computer, a left footrest having a left pressure pad and a right footrest having a right pressure pad, the left footrest and right footrest being supported by the chassis, and a set of handlebars mounted to the chassis via a stem and steer tube that is orthogonal to the handlebars, wherein the handlebars are rotatable about its longitudinal axis and about a longitudinal axis of the steer tube. In disclosed embodiments, the aircraft is steerable in a roll axis by an application of pressure on the left footrest and right footrest, in the yaw axis by rotating the handlebars about the longitudinal axis of the steer tube and in the pitch axis by rotating the handlebars in its longitudinal axis.

In another embodiment, an aircraft includes a chassis, a flight computer, a seat for a pilot to sit atop, the seat being mounted to the chassis via pivoting mechanism that enables the seat to shift to the right and left, and a set of handlebars mounted to the chassis via a stem and steer tube that is orthogonal to the handlebars, wherein the handlebars are rotatable about its longitudinal axis and about a longitudinal axis of the steer tube. In disclosed embodiments, the aircraft is steerable in a roll axis by shifting the seat to the right or left, in the yaw axis by rotating the handlebars about the longitudinal axis of the steer tube and in the pitch axis by rotating the handlebars in its longitudinal axis.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Figure 1:
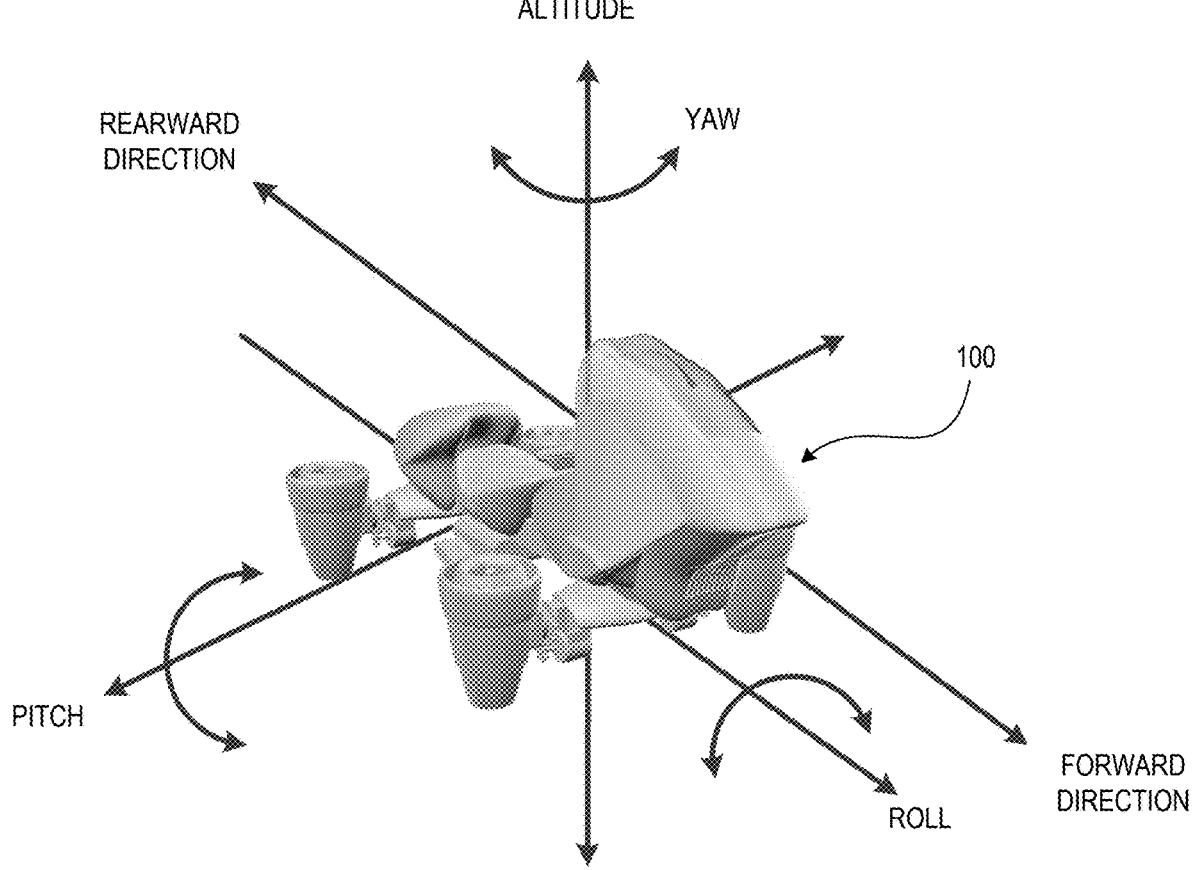
FIG. 1 illustrates the basic flight control directions described herein, according to some embodiments.

An Intuitive-Flight Control System (I-FCS) is disclosed to control the forward and backward movement as well as the three axes of rotation. FIG. 1 illustrates these three axes of rotation pitch, yaw and roll for an airborne aircraft 100 where the pilot sits on a seat as if riding a motorcycle. The aircraft flight control inceptors mimic the already familiar control systems found on modern motorcycles and scooters. In this way, the pilot uses the already familiar actions of controlling the airborne aircraft as if the pilot is riding a motorcycle.

The I-FCS utilizes pressure or movement sensors mounted in control areas commonly found on motorcycles and scooters. Along with thrust, each of the three axes of flight are controlled by the pressure and/or movement input received by the sensors that are then interpreted by the I-FCS computer software. In this way, the more pressure or movement a given sensor receives, the greater the input to the on-board flight computer receives, which in turn sends commands to that control surface or thrust of that propulsion system.

A number of physical components are used to mount the sensors. It is noted that the physical components are necessary for the pilot to "ride" and control the aircraft. Of the possible familiar physical components are footrests, handlebars, and hand grips. These physical components can be built in many different shapes and sizes. Since the flight control sensors are placed on, or are attached to, the established physical components, any sensor commonly used in the art can be used.

As with virtually all flight systems, primary and secondary sensors are included for redundancy. The flight control computer software is tasked with reading the primary sensor change of state and comparing it to the secondary sensor change of state and determining if either of the sensors is reading out of specification or failing altogether. If such a reading/reporting error is encountered, the I-FCS is instructed to return the aircraft to automated or pre-programmed flight to an established "home" location. The home location or a closer landing zone (LZ) is entered in the flight control system GUI at startup or gleaned from an included GPS system where safe landing zones are marked and mapped for emergency landings.

Figure 2A:
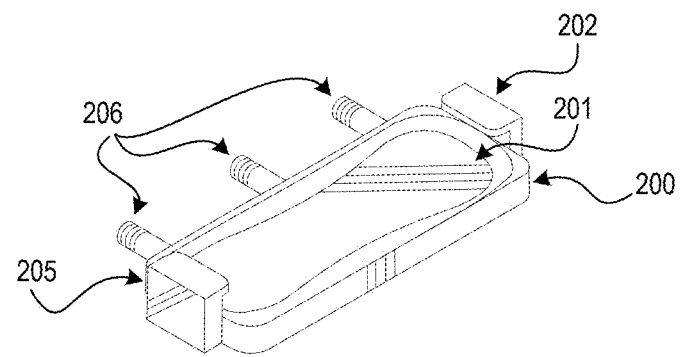
FIG. 2A illustrates a footrest with pressure pad, pilot footwear locking points, and supports, according to some embodiments.

FIG. 2A illustrates a footrest 200 with pressure pad 201, pilot footwear locking brackets 202 and 205, and supports 206, according to some embodiments. As the name suggests, the footrest 200 supports the pilot's foot when piloting the aircraft. In the embodiment shown, the pilot may secure his or her foot to the aircraft by clipping their footwear into the pilot footwear locking brackets 202 and 205. In this way, the pilot's feet will not slip in the course of flight. A number of different types of footwear locking mechanisms commonly used in the art can be used to safely attach the pilot's footwear and would also include a quick release feature. Further, the attachment point or points of the footrest 200 would be determined by the aircraft structure and primarily provide a stable connection point for the footrest. The supports 206 serve to attach the footrest 200 to a frame of the aircraft.

Figure 2B:
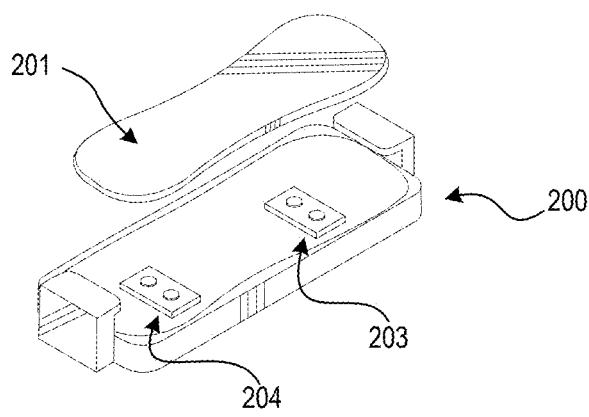
FIG. 2B illustrates the placement of both primary and secondary pressure sensors for the Intuitive-Flight Control System (I-FCS) roll control in a footrest, according to some embodiments.

FIG. 2B illustrates the placement of both primary and secondary pressure sensors for the Intuitive-Flight Control System (I-FCS) roll control in footrest 200, according to some embodiments. Sensors 203 and 204 are placed on the footrest 200, to serve as flight control inceptors. Pressure applied to pressure plate 201 will incite a roll in the direction of the applied pressure. The I-FCS computer software uses the increased pressure as a change of value or change of state as an instruction to roll in that direction to the flight control computer. For instance, if a number is used, the number could report a change between 1-100, 1 being the least amount of roll in that direction and 100 being the most amount of roll in that direction. The change of state for any given sensor is dependent on the type of sensor and it is understood that whether it be analog, digital or some other signal transportation method, sensors common in the art can be used to record the change of state.

It is also understood that the I-FCS would include a left and a right side footrest in order to control the roll axis in both the left and right directions.

In one embodiment, the roll sensors would use a "zero-out" feature where the pilot would be able to put a nominal amount of weight on the footrest without inciting a roll. In this way, the pilot would be able to sit comfortably on the seat of the aircraft, with their feet locked in the footrests without affecting the aircraft's roll. The zero-out feature would be a part of the start-up procedure the pilot would go through before take-off. As part of the control system interface or GUI the pilot would lock their feet in the footrests and each footrest would report a pressure number (for instance a number between 1-10) which would then be zeroed-out in order to inform the I-FCS computer that this amount of pressure is not considered an instruction to roll the aircraft.

In the embodiment, since it is possible that both footrests could have pressure on them, part of the computer routine would be to measure the amount of pressure each footrest is receiving and compare it to the other and react to the footrest with the most pressure. In this way, if both footrests are receiving pressure, the footrest with the higher pressure would be the direction the aircraft would roll. This would ensure that regardless of the amount of pressure both footrests are receiving, the aircraft would continue to operate as expected and roll only in the direction of the most pressure. In this implementation, the difference in pressure between the left and right footrests may be determined to incite the appropriate magnitude of roll. For example, if the right footrest has a pressure measurement of 80 and the left foot rest has a pressure measurement of 70, rather than inciting a roll with magnitude of 80 to the right, the I-FCS computer may compute the difference between these measurements, which is 10, and incite a right-ward roll according to that magnitude.

Figure 2C:
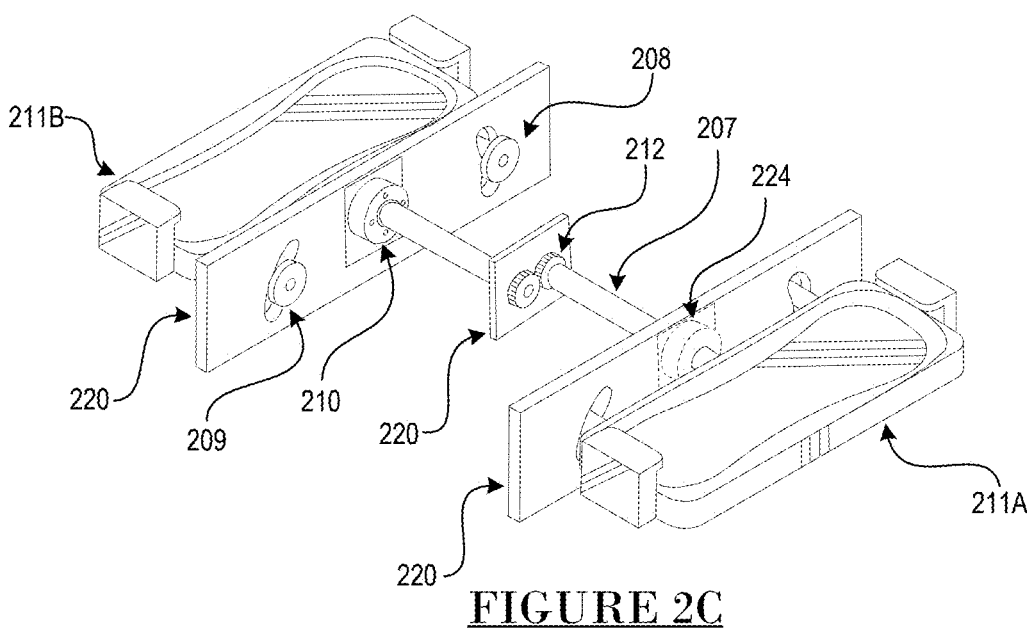
FIG. 2C illustrates a pivot point arrangement of "connected" footrests and the associated rotational sensors used to report roll instructions to the I-FCS, according to some embodiments.

FIG. 2C illustrates a pivot point arrangement of "connected" footrests 211A-B and the associated rotational sensors used to report roll instructions to the I-FCS, according to some embodiments. As shown, the footrests 211A-B would be secured to the aircraft chassis 220 with one or more pivot points 207. The footrests 211A-B, which are pivotable, are secured to the vehicle frame 208-209 where the movement is captured by primary and secondary rotational movement sensors 210 and 224. The pilot would use the forward rotation of either footrest 211A-B to incite a roll in the same direction as either footrest 211A or 211B. For instance, if the pilot rotated footrest 211A on the right forward, the I-FCS would receive the instruction to roll to the right side. Similarly, if the pilot rotated the left footrest 211B forward, the I-FCS would receive that sensor value change as an instruction to roll the aircraft to the left side. Further, the two footrests are connected by a gear mechanism 212 that raises the right footrest 211A when the left footrest 211B is lowered and conversely raises the left footrest 211B when the right footrest 211A is lowered. In this way the I-FCS would not be able to receive contradictory roll commands.

In this embodiment, when a roll is incited in either direction, rotational movement sensors 210 and 224 or a similar sensor would report a value or change status and report that difference to the I-FCS. For instance, if a number value is used, the readings could be a value change between 1-100 (1 being the least amount of roll and 100 being the most amount of roll). As an example, when the left footrest 211B is rotated forward the movement from the sensor would be a number between 1-100 "roll left." Equally, if the pilot rotates the right footrest 211A forward, a roll to the right is initiated. Similarly, the movement sensors would report a number change to the flight computer between 1 to 100 "roll right." These sensors 210 and 224 and their output values would be considered low-level commands in a basic command control structure with pre-defined safety limits in order to keep the aircraft within its normal operating parameters. A haptic feedback module is also included (not shown) in order to inform the pilot of the pre-programmed tolerances the roll is inciting to keep the pilot informed of the stresses on the aircraft while in a roll condition.

Figure 2D:
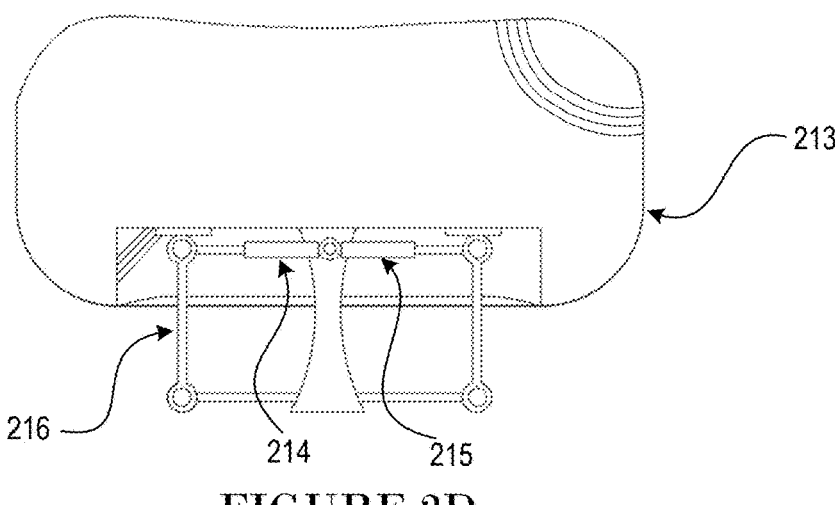
FIG. 2D illustrates a pilot seat capable of pivoting left and right with primary and secondary sensors placed to report a roll instructions to the I-FCS, according to some embodiments.

FIG. 2D illustrates a pilot seat 213 capable of pivoting left and right with primary and secondary sensors placed to report a roll instructions to the I-FCS, according to some embodiments. Since weight transfer, or leaning, is a familiar way to turn a motorcycle or scooter, the I-FCS has an embodiment where the seat 213 is used to incite roll. While most seats on a motorcycle or scooter are locked in place, in the embodiment shown in FIG. 2D, the I-FCS seat 213 would be able to shift from side to side. In its neutral position, support 216 (at 0.0 lean) the seat would not report any roll condition to the I-FCS. When the pilot leans in one direction or the other, the seat would shift or roll from neutral (0.0 position) and incite linear movement sensors 214-215, or similar sensors, instructing a roll in that direction.

Figure 2E:
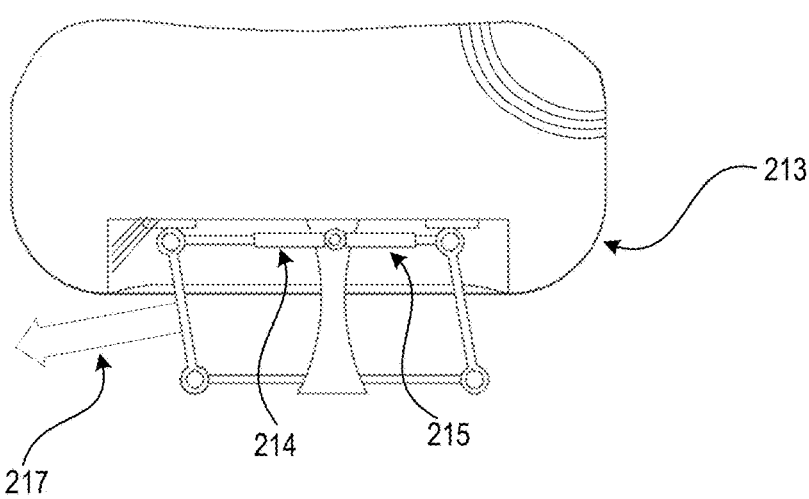
FIG. 2E illustrates a pivotable pilot seat in the left roll position, according to some embodiments.

FIG. 2E illustrates pilot seat 213 in the left roll position, according to some embodiments. As shown, when the pilot leans to the left, the seat would shift to the left 217 where linear sensors 214-215 would report a movement to the left 217. If numerical values are used, the reported movement from the sensors would be a number between 1-100 "roll left."

Figure 2F:
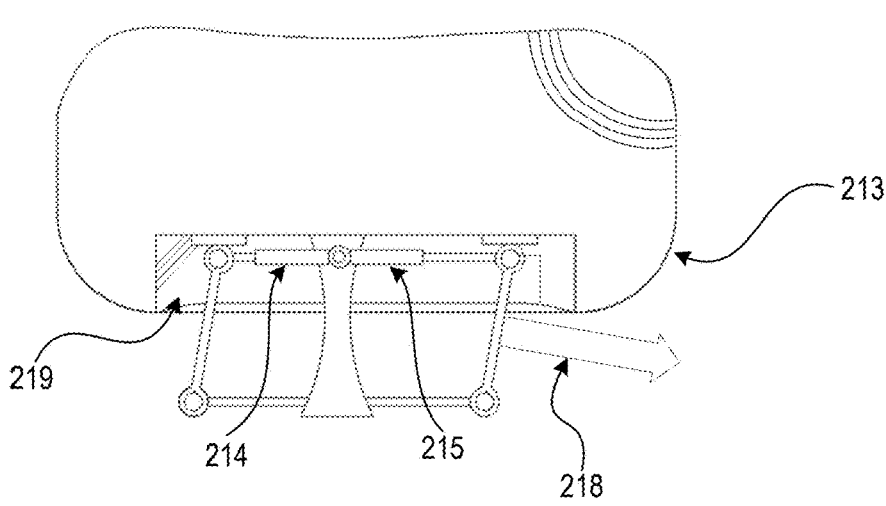
FIG. 2F illustrates a pivotable pilot seat in the right roll position, according to some embodiments.

FIG. 2F illustrates pilot seat 213 in the right roll position, according to some embodiments. As shown, if the pilot leans to the right 218, the seat 213 would shift or move in the right 218 from neutral and report a roll to the right. The same movement sensors 214-215 would report a number or value change to the flight computer between 1 to 100 "roll right." In various embodiments, the seat would further be "sprung" so that when no lean or pivot is present, the seat returns to the 0.0 position, reporting "no roll" state. Sensors 214-215 and their output values would be considered low-level commands in a basic command control structure with predefined safety limits in order to keep the aircraft within its normal operating parameters. A haptic feedback module 219 is also included in order to inform the pilot of the pre-programmed tolerances the roll is inciting to keep the pilot informed of the stresses on the aircraft while in a roll condition.

Figure 2G:
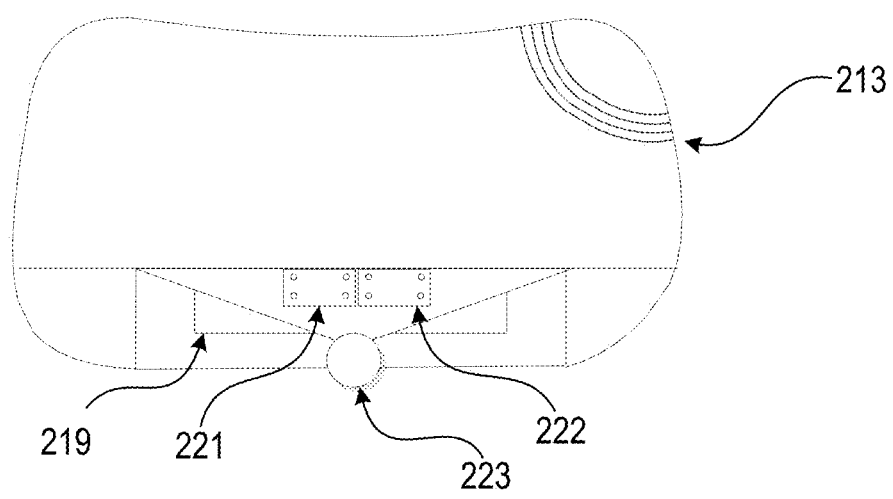
FIG. 2G illustrates a pivotable seat utilizing tilt sensors for roll control, according to some embodiments.

FIG. 2G illustrates seat 213 utilizing tilt sensors for roll control, according to some embodiments. In the embodiment shown, tilt sensors are used in conjunction with the pilot seat 213 in order to roll the aircraft left or right. In FIG. 2G both primary and secondary sensors 221-222 are located on the bottom of the pilot seat 213 in order to record a lean in one direction or the other. In this case, the pilot seat 213 is balanced and supported on a tilt mechanism 223 in the 0.0 degree of roll position. As the pilot shifts their weight the seat 213 is capable of rocking both right and left in order to "tilt" or roll the aircraft in one direction or the other. The tilt sensors are used in tandem so that primary and secondary readings can be compared and used to instruct the I-FCS.

For example, if numerical values are used, when the pilot leans to the right, the tilt sensors 221-222 would report a numerical change to the flight computer between 1 to 100 to "roll right." If the pilot leans to the left, the tilt sensors would similarly report a numerical value change to the flight computer between 1 and 100 "roll left." The seat would further be "sprung" so that when no lean or pivot is present, the seat returns to the 0.0 position, reporting "no roll" state. These sensors and their output values would be considered low-level commands in a basic command control structure with pre-defined safety limits in order to keep the aircraft within its normal operating parameters. A haptic feedback module 219 is also included in order to inform the pilot of the pre-programmed tolerances the roll is inciting to keep the pilot informed of the stresses on the aircraft while in a roll condition.

FIG. 3A shows an example of handlebars 301 used to control yaw and pitch, according to some embodiments. A number of sensors are secured in stem 302 where handlebars 301 are supported for the pilot. The handlebars 301 are both pivotable and turnable while still attached to the aircraft so that the pilot has a place to grasp and incite yaw and pitch commands. Around this stem 302, a number of primary and secondary sensors are secured.

FIG. 3B illustrates in detail an example of the handlebar hand grips for the I-FCS, including an I-FCS graphical user interface (GUI) screen, according to some embodiments. As shown, the handlebars 301 include a left hand grip 303 and right hand grip 307. Pilot glove locking mechanisms 304 and 308 are also shown and used to retain the pilot's hands to the handlebars and hand grips. In an embodiment of the I-FCS, selector switch wheels 305-306 would be used to select the different options presented by the flight control system. In some embodiments, the I-FCS would include an on-board LCD type of screen 309 with a graphical user interface (GUI) following the pilot responses in real time. An LCD interface screen would allow the pilot to confirm or reject the flight options presented by the I-FCS pilot interface. While an LCD screen is mentioned, any type of monitor/screen is implied as there are many types of displays available and common in the art.

FIG. 3C illustrates a "throttle" hand grip 307 and the twisting motion used to increase or decrease the forward or rearward movement of the aircraft, according to some embodiments. As shown, the direction of flight is presented as a vehicle moving forward from left to right. Hand grip 310 can be twisted backward 311 or forward 312 to increase or decrease forward movement, respectively. While thrust in an aircraft is usually controlled by setting a percentage of max power in the range between 0 and 100 percent, the I-FCS has the option of using an established and familiar handgrip that would rotate counter-clockwise 311 to increase the power percentage from 0 to 100 and clockwise 312 to decrease from 100 to 0 percent, with any percentage in both directions in between. In this way, similar to twisting the hand grip on a motorcycle or scooter, the hand grip 310 of an I-FCS aircraft would increase or decrease the forward movement as a percentage of the rotation as it is translated to the on-board flight computer. 0 percent would indicate a hover status, and trigger an option to return to programmed flight, while +100 percent would indicate a maximum forward movement condition. It would further be an individual pilot's choice to "set" a thrust percentage manually using a lever or similar device. Further, in an aspect of the invention, a rotational factor of less than zero is introduced which would indicate a reverse or rearward direction command to the I-FCS. For safety reasons, it is best practice to limit the rearward power percentage.

FIG. 4A illustrates an example of a yaw control using a linear potentiometer sensor array for the I-FCS, according to some embodiments. Yaw control is an essential component to aerial flight. FIG. 4A shows an example of handlebar 301 mounted yaw control position sensor array housing 401. Position sensors 403-406 are located as primary and secondary sensors for both left and right yaw control. In FIG. 4A, sensors are in their zero position in which no yaw change is being reported. The handlebars 301 can be turned on a central pivot point 402 in the intuitive and familiar way found on motorcycles and scooters. As the handlebars 301 are turned left or right, sensor activator 407 pushes against primary and secondary yaw sensors 403-406 for that direction. As a result, the I-FCS receives the change of state from the sensors 403-406 and yaw the vehicle in that direction.

FIG. 4B shows pilot-controlled handlebars 301 turned right where sensor activator 407 pushes against sensors 403 and 405 to generate a yaw left command, according to some embodiments. FIG. 4B shows an example of the handlebars 301 turned to the right 408 where the yaw sensor activator 407 has placing force on the primary and secondary sensors 403-406, which report a "left yaw" state to the I-FCS (right turn=yaw left).

FIG. 4C shows pilot controlled handlebars 301 turned left where sensor activator 407 pushes against sensors 404 and 406 to generate a yaw right command, according to some embodiments. In FIG. 4C handlebars 301 are turned to the left 409, where the sensor activator 407 has placed a force on the primary and secondary sensors 404 and 406 to report a "yaw right" state (left turn=yaw right) to the I-FCS. In other words, as the handlebars 301 are rotated around the pivot point 402 in one direction or the other, the yaw sensor activator 407 rotates to place a force on the sensors 404 and 406, which the sensors translate into a command to the on-board flight computer to yaw the aircraft in one direction or the other. For instance, if numerical values are used, when the pilot turns the bars to the left, the reported movement from the sensors would be a number between 1-100 "yaw right." Similarly, if the pilot turns the handlebars to the right, the reported number or value to the flight computer would be between 1 to 100 "yaw left."

Sensors 403-406 and their output values would be considered low-level commands in a basic command control structure with pre-defined safety limits in order to keep the aircraft within its normal operating parameters. A haptic feedback module 410 is also included in order to inform the pilot of the pre-programmed tolerances the yaw is inducing to keep the pilot informed of the stresses on the aircraft while in a yaw left or yaw right condition.

FIG. 4D illustrates an example of a linear positioning sensor array 401 for yaw control for the I-FCS, according to some embodiments. In FIG. 4D the use of linear position sensors 411-414 is included. Secured similarly as the position sensors 403-406 in FIGS. 4A-4C, the linear position sensors 411-414 are attached to both the sensor array housing component 401 and the sensory array activator 407. In this way, the sensors are secured to the actuator 407 when the handlebars 301 are turned in either direction 415. As with the positioning sensors, the linear position sensors 411-414 report to the I-FCS and inform the on-board computer which direction and how much to yaw the aircraft. For instance, if the pilot turns the bars to the left, the reported movement from the sensors would be a number between 1-100 "yaw right." Similarly, if the pilot turns the handlebars to the right, the reported number or value to the flight computer would be between 1 to 100 "yaw left."

FIG. 4E illustrates an example of a rotary positioning sensor array for yaw control for the I-FCS, according to some embodiments. As shown, the handlebars 416 are secured a stem 422, which is in turn secured to a steer tube 420. Steer tube 420 is secured to headtube 419 via bearings or bushings and thereby secured to the aircraft chassis 421. The headtube 419 houses the steer tube 420 which secures the handlebars 416 to the aircraft. FIG. 4E shows a handlebar 416 located in a headtube 419 with primary and secondary rotary positioning sensors 417-418 to report the rotation of the handlebars. The rotary sensors are incited by the steer tube 420 that runs from the top of the head tube to the bottom. The headtube 419 is attached to the aircraft chassis 421 as is common in the art. In this way, when the handlebars are centered, a 0.0 degree of yaw is reported. When the bars are turned to the left, a "right yaw" condition is reported. Similarly, when the bars are turned to the right, a "left yaw" condition is reported. For instance, if numerical values are used, when the pilot turns the bars to the left, the reported movement or value change from the rotary sensors would be a number between 1-100 "yaw right." Similarly, if the pilot turns the handlebars to the right, the reported number or value to the flight computer would be between 1 to 100 "yaw left."

These sensors and their output values would be considered low-level commands in a basic command control structure with pre-defined safety limits in order to keep the aircraft within its normal operating parameters. A haptic feedback module 410 is also included in order to inform the pilot of the pre-programmed tolerances the yaw is inducing to keep the pilot informed of the stresses on the aircraft while in a yaw left or yaw right condition.

FIG. 5A illustrates an example of a linear positioning control sensor array for pitch control for the I-FCS, according to some embodiments. Since pitch is an additional rotational factor in airborne flight not found on motorcycles or scooters, the I-FCS includes an inceptor configuration FIG. 5A that includes pitch control. Pitch, or elevation change which indicates a "nose up" or "nose down" condition is also controlled using the handlebars or similar support system. In this example, the I-FCS pitch sensor array is housed in component 500. The handlebars 503, although attached to the head tube which in turn is attached to the vehicle chassis (not shown), are able to pivot forwards and backwards within the headtube assembly. In this way, the sensor activator 504, which is attached to the handlebars is free to incite both sets of linear positioning sensors. As shown, the primary positioning sensors 501-502 and secondary sensors 505-506 are located around the handlebar 503 to act as pitch degree receivers. In this way, vehicle pitch input is captured as the handlebars are rotated forward or backwards allowing the input from the sensors to control the aircraft nose elevation.

FIG. 5B illustrates an example of a steering angle sensor array for pitch control for the I-FCS, according to some embodiments. As the handlebars 503 are pulled backwards in FIG. 5B (towards the pilot), a sensor activator 504 moves the pitch up sensors 501 and 505 which read the increased movement and translate that as a "nose up" elevation command. In FIG. 5C, the handlebars 503 are pushed forward (away from the pilot) such that the same activator 504 moves the sensors 502 and 506 to read the increased movement and translate that as a "nose down" command to the on-board flight computer.

In these embodiments, when the handlebars 503 are centered, a 0.0 degree of pitch change is reported. When the handlebars 503 are pulled back a "nose up" condition is reported. Similarly but opposite, when the handlebars 503 are pushed forward, a "nose down" condition is reported. For instance, if numerical values are used, when the pilot pulls the handlebars 503 back, the reported movement or value change from the position sensors 501 and 505 would be a number between 1-100 "nose up". Similarly, if the pilot pushes the handlebars 503 forward, the reported movement or value change from the position sensors 502 and 506 number or value change between 1-100 "nose down".

These sensors 501, 502, 505, and 506 and their output values would be considered low-level commands in a basic command control structure with pre-defined safety limits in order to keep the aircraft within its normal operating parameters. A haptic feedback module 507 is included to inform the pilot of the tolerances the pitch change is inciting to keep the pilot informed of the stresses on the aircraft.

FIG. 5D illustrates another embodiment for controlling pitch. As shown in FIG. 5D, the pitch control sensor array utilizes steering angle sensors 508-509 to read the rotational change of the handlebars 503 in order to instruct the I-FCS of pitch angle change. The steering angle sensors 508-509 are positioned and secured next to the handlebars 503 securing mechanisms 510A-510B or similar support system. In this way, as the handlebars 503 are rotated backward (nose up) or forward (nose down) 511 the I-FCS is instructed to nose up or nose down the aircraft. For example, when the handlebars are centered, a 0.0 degree of pitch change is reported. When the bars are pulled back a "nose up" condition is reported. Similarly but opposite, when the bars are pushed forward, a "nose down" condition is reported. For instance, if numerical values are used when the pilot pulls the bars back, the reported movement or value change from the position sensors would be a number between 1-100 "nose up." Similarly, if the pilot pushes the handlebars forward, the reported number or value change to the flight computer would be between 1 to 100 "nose down."

These sensors 508-509 and their output values would be considered low-level commands in a basic command control structure with pre-defined safety limits in order to keep the aircraft within its normal operating parameters. A haptic feedback module 513 is included in order to inform the pilot of the pre-programmed tolerances the pitch change is inciting to keep the pilot informed of the stresses on the aircraft.

It is noted that many different types of movement or weight reporting sensors capable of capturing the subtlest of movements from the pilot can be used with the I-FCS. The sensor array itself is responsible for instructing the I-FCS once a change is incited by the pilot and this can be done by many types of sensors common in the art. Similarly, since it is possible to mount the sensors and also incite a change in state in many different ways, the I-FCS is only dependent on receiving a change in state for any of the axis in order to maneuver as intended.

In another aspect of the I-FCS, gyroscopes are used as part of the flight control system. Either separately or in tandem with other sensors they are used to detect the shift in balance present when the pilot leans in one direction or another. Along with gyroscopes, tilt sensors are used to send low-level commands to the on-board flight computer and change the flight characteristics of the aircraft. Both primary and secondary gyroscopes and tilt sensors are placed in matching planes of the three axes of rotation in order to inform the I-FCS of pilot control input.

According to an aspect of the I-FCS, the flight control sensors transmit flight commands to the on-board flight computer of a single or multi-propulsion aircraft where the combined input from the pilot manipulated inceptors control the aspects of airborne flight. When the I-FCS is operated in manual mode, the pilot can perform any flight state desired for safe aerial navigation including, but not limited to, free flight, take-off, hoover and landing, additionally in an embodiment of the I-FCS, it would be integrated in an established on-board flight computer system that has both automated and programmed flight control. Automated and programmed flight states would allow the pilot to take-off, hoover and land automatically without the interaction of the manual control aspect of the I-FCS. In this way, a combination of the automated and manual systems is integrated for greater flexibility and flight safety.

According to an aspect of the I-FCS, the flight control sensors transmit low-level flight commands to the on-board flight computer to control the pitch, yaw and roll on a multi-propulsion aircraft where different propulsion systems may be in use. Ranging from jet engines, vectored thrust engines, ducted rotor platforms, open rotor platforms, or other types of propulsion systems designed to create lift can similarly be controlled by the I-FCS; in this way, manipulating thrust for controlled flight is similar in practice independent of the type of propulsion system in use.

According to another aspect of the I-FCS, the type of propulsion unit becomes ubiquitous when the I-FCS is used to maintain controlled flight through propulsion vectoring. In this aspect, known as thrust vectoring flight control (TVFC), the propulsion unit or its thrust output is vectored or pointed in one direction or another to maintain controlled flight. While there are several ways to vector the thrust output from an engine, including gimbaling the engine nacelle or exhaust vane manipulation, the net result is that attitude, pitch, yaw, roll and forward/rearward movement of the aircraft is controlled by thrust vectoring.

In another aspect of the I-FCS, the flight control sensitivity is addressed by including a multi-mode switch capable of selecting several modes of sensitivity. The mode switch would allow less sensitivity for beginner pilots whereas intermediate mode would suit pilots with some experience. Expert, or maximum sensitivity, mode would match an experienced pilot's abilities and increase the sensitivity of the inceptors for the most responsive manual flight control.

Figure 6:
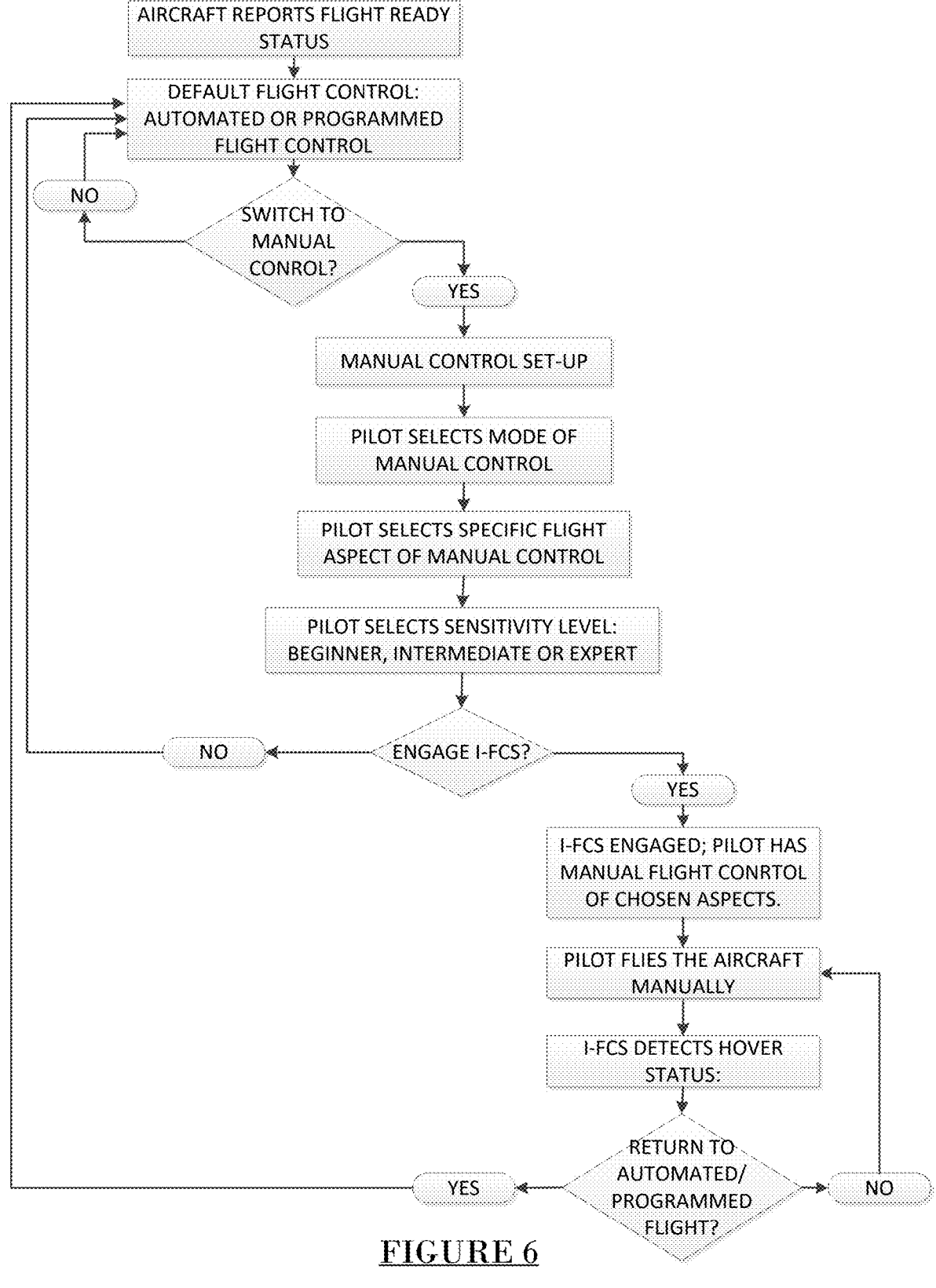
FIG. 6 illustrates a flowchart of a method for pilot engagement or disengagement of the IFCS in order to enter manual control or return to programmed flight of the aircraft, according to some embodiments.

FIG. 6 shows an example of a flowchart of the process the I-FCS would use to present a pilot the option to engage or disengage the manual flight mode available with the intuitive-flight control system. In the process example, the pilot is queried with options to engage the I-FCS and which characteristics the pilot chooses to control and which the pilot chooses not to control. The process would also include a return to programmed or automated flight. Best practices would provide the pilot a number of different ways to release the aircraft back to automated or programmed flight. This would ensure the pilot is always operating within their experience level and keep the aircraft within its normal and safe operating parameters.

Figure 7:
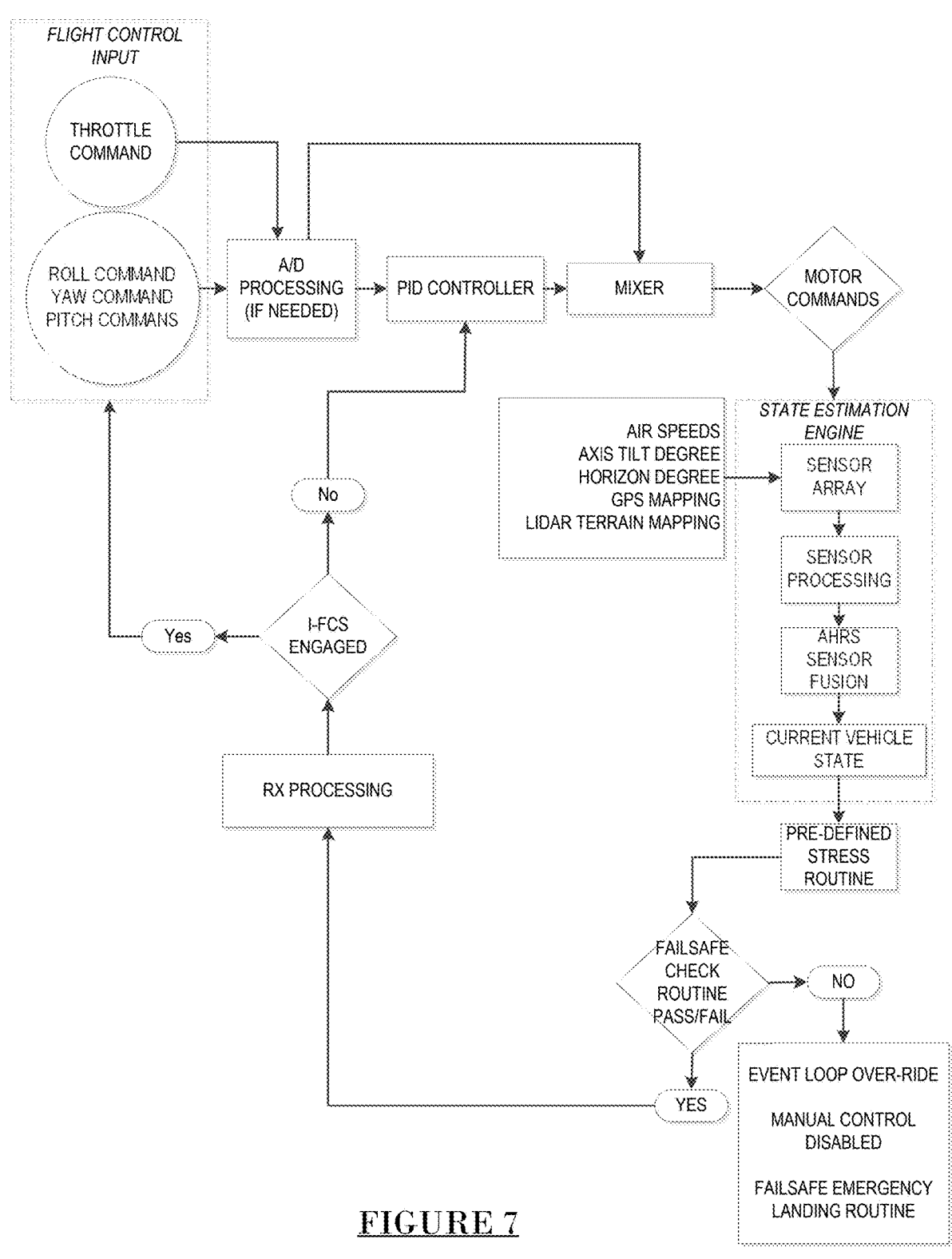
FIG. 7 illustrates an example of a flight control loop for the I-FCS, according to some embodiments.

FIG. 7 shows an example of the basic components and methods used in a flight controller loop. While the example shows some of the methods used to control airborne flight, a number of components and processes are used to provide greater safety and maneuverability. These components include, but are not limited to: a barometer, GPS positioning and mapping, failsafe mode and lidar.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. An aircraft comprising:
   a chassis;

a flight computer;

a seat for a pilot to sit atop, the seat being mounted to the chassis via pivoting mechanism that enables the seat to shift to the right and left;

a set of handlebars mounted to the chassis via a stem and steer tube that is orthogonal to the handlebars, wherein the handlebars are rotatable about its longitudinal axis and about a longitudinal axis of the steer tube;

wherein the aircraft is steerable in a roll axis by shifting the seat to the right or left;

wherein the aircraft is steerable in the yaw axis by rotating the handlebars about the longitudinal axis of the steer tube; and wherein the aircraft is steerable in the pitch axis by rotating the handlebars in its longitudinal axis.

2. The aircraft of claim 1, further comprising:

one or more movement sensors configured to measure movement of the seat to the left or right, the one or more movement sensors configured to signal movement measurements to the flight computer, wherein the flight computer generates a roll command to the right when the seat is shifted to the right and a roll command to the left when the seat is shifted to the left.

3. The aircraft of claim 2, wherein the pivoting mechanism includes a parallelogram linkage with two upper pivots and two lower pivots, the two lower pivots being fixed to the chassis.

4. The aircraft of claim 3, wherein a magnitude associated with the roll command to the left or right is proportional to a magnitude of the shift of the seat.

5. The aircraft of claim 2, wherein the pivoting mechanism includes a single pivot point.

6. The aircraft of claim 1, further comprising:

a set of sensors configured to measure a rotation of the handlebars about the longitudinal axis of the steer tube and communicate a rotation measurement to the flight computer, wherein the flight computer is configured to generate a yaw command to the left when the handlebars are rotated to the right and a yaw command to the right when the handlebars are rotated to the left.

7. The aircraft of claim 6, wherein the set of sensors include one or more of positional sensors, linear position sensors, and rotational sensors.

8. The aircraft of claim 1, further comprising:

a set of sensors configured to measure a rotation of the handlebars about its longitudinal axis and communicate a rotation measurement to the flight computer, wherein the flight computer is configured to generate pitch down command when the handlebars are rotated forward and a pitch up command when the handlebars are rotated backward.

9. The aircraft of claim 1, further comprising a rotatable grip attached to the handlebars, the rotatable grip configured to generate signals to the flight computer for acceleration and deceleration.

10. The aircraft of 1, wherein the handlebars include a pilot glove locking mechanism to secure a pilot glove.

* * * * *